US007495679B2

(12) United States Patent  
Chou

(10) Patent No.: US 7,495,679 B2  
(45) Date of Patent: Feb. 24, 2009

(54) METHOD AND SYSTEM FOR AUTOMATICALLY CALIBRATING A COLOR DISPLAY

(75) Inventor: Chih-Hsien Chou, San Jose, CA (US)

(73) Assignee: Kolorific, Inc., Milpitas, CA (US)

( * ) Notice: Subject to any disclaimer, the term of this patent is extended or adjusted under 35 U.S.C. 154(b) by 666 days.

(21) Appl. No.: 11/196,640

(22) Filed: Aug. 2, 2005

(65) Prior Publication Data

US 2007/0052735 A1 Mar. 8, 2007

(51) Int. Cl.
*G09G 5/10* (2006.01)
(52) U.S. Cl. ...................................... 345/690; 345/691
(58) Field of Classification Search .................. 345/77, 345/589–591, 601, 690, 600, 691, 692; 702/107; 348/189–193, 616, 673, 645, 678, 679; 725/144; 382/162, 147, 266; 709/200; 342/451
See application file for complete search history.

(56) References Cited

U.S. PATENT DOCUMENTS

| | | | | |
|---|---|---|---|---|
| 4,502,073 A * | 2/1985 | Hinn et al. .................... 348/193 |
| 4,518,986 A * | 5/1985 | Hinn et al. .................... 348/190 |
| 4,769,703 A * | 9/1988 | Osborne et al. ............... 348/189 |
| 4,941,164 A * | 7/1990 | Schuller et al. ............... 378/205 |
| 5,001,344 A * | 3/1991 | Kato et al. .................... 250/307 |
| 5,404,318 A * | 4/1995 | Hoffert et al. ................ 709/200 |
| 5,621,811 A * | 4/1997 | Roder et al. .................. 382/147 |
| 5,966,150 A * | 10/1999 | Lester et al. .................. 347/43 |
| 6,243,059 B1 | 6/2001 | Greene et al. ................. 345/88 |
| 6,441,563 B1 | 8/2002 | Kao et al. ..................... 315/169.3 |
| 6,462,777 B1 | 10/2002 | Hamaguri ..................... 348/188 |
| 6,493,878 B1 * | 12/2002 | Kassatly ....................... 725/144 |
| 6,690,383 B1 | 2/2004 | Braudaway et al. .......... 345/600 |
| 6,775,633 B2 | 8/2004 | Edge ............................ 702/107 |
| 6,844,881 B1 * | 1/2005 | Chen et al. .................... 345/589 |
| 7,068,263 B2 | 6/2006 | Evanicky et al. |
| 7,084,881 B1 * | 8/2006 | Chen et al. .................... 345/589 |
| 7,095,451 B2 * | 8/2006 | Kitazawa et al. ............. 348/679 |
| 7,102,648 B1 * | 9/2006 | Holub ........................... 345/589 |
| 7,298,328 B2 * | 11/2007 | Wang et al. ................... 342/451 |
| 7,302,111 B2 * | 11/2007 | Olsson et al. ................. 382/266 |
| 7,321,400 B1 * | 1/2008 | Chou et al. .................... 348/616 |
| 7,328,116 B2 * | 2/2008 | Bala et al. ..................... 702/107 |
| 7,352,410 B2 * | 4/2008 | Chou ............................ 348/673 |
| 7,428,997 B2 * | 9/2008 | Wiklof et al. ............. 235/462.42 |
| 2003/0103104 A1 * | 6/2003 | Kushner et al. ............... 347/43 |
| 2003/0160980 A1 * | 8/2003 | Olsson et al. ................. 358/1.9 |
| 2003/0214607 A1 * | 11/2003 | Kitazawa et al. ............. 348/678 |

(Continued)

*Primary Examiner*—Prabodh Dharia  
(74) *Attorney, Agent, or Firm*—Pinnacle Patent Law Group

(57) ABSTRACT

A system for calibrating a display device to improve its perceived image quality includes a calibration module configured to determine, for each of a plurality of white colors associated with a plurality of gray levels, a measured chromaticity point on a chromaticity diagram and a measured luminance level. The calibration module calculates, for each gray level, a differential change in each primary color component that simultaneously moves the measured chromaticity point to a target chromaticity point and adjusts the measured luminance level to a target luminance level on a predetermined luminance curve having a target gamma value, and calculates correction values for each primary color component and each gray level based on the calculated differential changes. The system also includes means for outputting the calculated correction values to the display device, which corrects the primary color components of a color video signal based on the calculated correction values.

25 Claims, 7 Drawing Sheets

U.S. PATENT DOCUMENTS

| | | | |
|---|---|---|---|
| 2004/0131371 A1* | 7/2004 | Itagaki et al. | 399/49 |
| 2005/0151752 A1* | 7/2005 | Phan | 345/589 |
| 2006/0125692 A1* | 6/2006 | Wang et al. | 342/451 |
| 2006/0238655 A1* | 10/2006 | Chou | 348/645 |
| 2006/0247877 A1* | 11/2006 | Bala et al. | 702/107 |
| 2006/0250412 A1* | 11/2006 | Chen et al. | 345/589 |
| 2006/0268180 A1* | 11/2006 | Chou | 348/673 |
| 2006/0280360 A1* | 12/2006 | Holub | 382/162 |
| 2007/0132674 A1* | 6/2007 | Tsuge | 345/77 |

* cited by examiner

METHOD AND SYSTEM FOR AUTOMATICALLY CALIBRATING A COLOR DISPLAY

FIELD OF THE INVENTION

The present invention relates in general to displaying images on a color display device and in particular to a method and system for automatically adjusting and correcting luminance and color chromaticity values to improve the perceived image quality of the color display device.

BACKGROUND OF THE INVENTION

Color images can be captured and converted into a video signal, which can be transmitted to a display system, such as a television. The display system typically processes the input video signal and transmits the processed video signal to a display device, which reproduces the luminance and color of the images onto its display screen for a viewer. Typical display devices include liquid-crystal displays (LCD), cathode-ray tubes (CRT), and plasma display panels (PDP). Each display device employs complex mechanisms that take the video signal and reproduce the luminance and color properties of the image.

For example, the luminance and color reproduction of an LCD is characterized by the spectral power distribution (SPD) of a backlight, e.g., cold-cathode fluorescent light (CCFL) tubes or light-emitting diodes (LEDs), the transmission characteristics of the polarizers and color filters for each primary-color sub-pixel on the screen, and the transmission characteristics of the liquid crystal cells under different electrical field strengths controlled by each pixel data from the input video signal. The luminance and color reproduction of a CRT are characterized by the SPD of each kind of phosphor material of each primary-color dot in a triad on the screen and the electron emitting dynamics of the electron guns under different electrical field strengths on the grids controlled by the input video signal. The luminance and color reproduction of a PDP are characterized by the SPD of each kind of phosphor material of each primary-color sub-pixel on the screen and the electrical discharge dynamics of the dielectric layers among the electrodes with voltage differences controlled by each pixel data from the input video signal.

Important properties of a display device are characterized by the chromaticity values of the device's primary color components, the reference white point, and the device's power transfer function from input signal voltage to output luminance level. In a typical display device, luminance curves, gamma values, color chromaticity values, and color temperatures are set to predetermined nominal settings during the manufacturing process. With these settings, the ideal display device can accurately reproduce the luminance and color properties of the captured image to provide an enjoyable viewing experience for the viewer.

Nonetheless, most mass-produced display devices are less than ideal. The predetermined nominal settings are difficult to attain due to the display device's imperfections that arise during the manufacturing process, as well as the complex underlying physical mechanisms of the display devices themselves. Thus, for standard mass-produced display devices, where quality control during manufacturing is more lax in order to keep costs low, the predetermined nominal settings are not necessarily achievable. For instance, because the nominal settings are usually mismatched, it is common for standard display devices to exhibit undesirable gray level color deviations and color temperature shifts. Such gray-level color deviations cause the measured chromaticity values of a displayed white color to drift on a chromaticity diagram with different gray levels. Moreover, gray-level color deviations also cause the measured color temperature of a displayed white color to vary with different gray levels. These undesirable color deviations and color temperature shifts diminish the image quality of the display device.

Moreover, the actual, i.e., measured, luminance curve of the standard display device can also deviate from the predetermined power-law transfer function. Accordingly, the measured luminance curves, gamma values, color chromaticity values, and color temperatures of typical mass-produced display devices usually deviate from expected values, and in some instances, the values that should be constant, e.g., gamma values, are variable and curves that are supposed to be smooth, e.g., luminance curves, are uneven. For these reasons, standard mass-produced display devices often render non-ideal perceived image quality.

Accordingly, it is desirable to provide a method and system for improving the perceived image quality of color display devices. In particular, it is desirable to provide a method for automatically calibrating a color display device such that the output characteristics of the display device are substantially in line with the expected output characteristics of an ideal display device.

SUMMARY OF THE INVENTION

In one version, a system for calibrating a display device to improve its perceived image quality includes a calibration module that is configured to determine, for each of a plurality of white colors associated with a plurality of gray levels displayed sequentially by the display device, a measured chromaticity point on a chromaticity diagram and a measured luminance level. The calibration module calculates, for each gray level, a differential change in each primary color component that simultaneously moves the measured chromaticity point to a target chromaticity point and adjusts the measured luminance level to a target luminance level on a predetermined luminance curve having a target gamma value, and calculates correction values for each primary color component and each gray level based on the calculated differential changes. The system also includes means for outputting the calculated correction values to the display device. The display device corrects the primary color components of a color video signal based on the calculated correction values such that the display device accurately reproduces luminance and color properties of the color video signal.

In another version, a display device includes a display screen that displays primary color components of a color video signal and a plurality of lookup tables. Each lookup table is associated with a primary color component and loads correction values for the associated primary color component. Each table includes an output that is coupled to an input of the display screen. Each of the plurality of lookup tables receives the associated primary color component of an input color video signal and outputs the correction value to the display screen so that the display device accurately reproduces luminance and color properties of the color video signal.

In another version, a display system includes a display device that displays primary color components of an input color video signal and the plurality of lookup tables that are loaded with the correction values for the associated primary color components.

In another version, a method for improving the perceived image quality of a display device used for displaying a color video signal includes determining, for each of a plurality of white colors associated with a plurality of gray levels displayed sequentially by the display device, a measured chromaticity point on a chromaticity diagram and a measured luminance level, calculating, for each gray level, a differential change in each primary color component that simultaneously moves the measured chromaticity point to a target chromaticity point and adjusts the measured luminance level to a target luminance level on a predetermined luminance curve having a target gamma value, and adjusting the primary color components of the color video signal based on the calculated differential changes such that the display device accurately reproduces luminance and color properties of the color video signal.

DESCRIPTION OF THE DRAWINGS

These features, aspects and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

DESCRIPTION OF THE INVENTION

The present invention relates in general to color display devices that display a color video signal and in particular to a method and system for automatically adjusting and correcting luminance and color chromaticity values to improve the perceived image quality of the color display. The following description is presented to enable one of ordinary skill in the art to make and use the invention and is provided in the context of a patent application and its requirements. Various modifications to the preferred embodiments and the generic principles and features described herein will be readily apparent to those skilled in the art. For instance, although the calibration system and process according one version of the present invention uses the CIE (X, Y, Z) tristimulus values and (x, y) chromaticity values, the method and system of the present invention is not necessarily limited to the CIE XYZ color system and the derived (x, y) chromaticity values. Those skilled in the art would readily appreciate that other well-defined color systems can also be used according to the method and system of the present invention, notably the perceptually uniform CIE (u', v') chromaticity values or the perceptually uniform CIE L*u*v* or CIE L*a*b* color systems. Thus, the present invention is not intended to be limited to the embodiments shown, but is to be accorded the widest scope consistent with the principles and features described herein.

Figure 1:
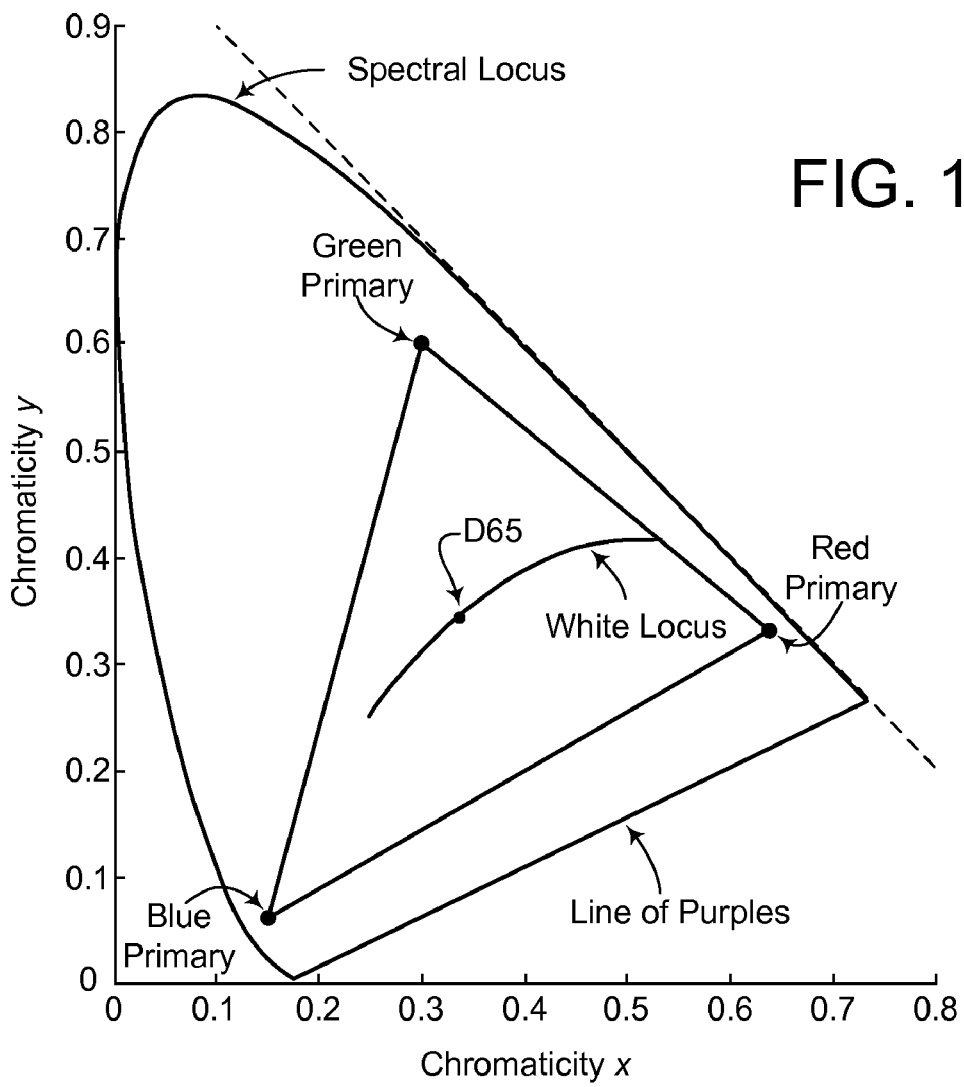
FIG. 1 is a CIE chromaticity diagram.

The characteristics of color inherently distinguishable by the human eye are chromaticity values (related to hue and saturation), and luminance (related to brightness). Accordingly, color systems characterize colors in various parameters which relate to hue, saturation, and brightness. Such a system includes the quantitative XYZ color system defined by Commission Internationale de l'Éclairage (CIE) in 1931, where all three tristimulus values (X, Y, Z) are positive and all visible colors are unambiguously represented by two chromaticity values (x, y) derived from the three tristimulus values (X, Y, Z). A mapping of all the visible colors produce a shark-fin-shaped region on the (x, y) plane known as a CIE (x, y) chromaticity diagram (illustrated in FIG. 1). The shark-fin-shaped region on the chromaticity diagram represents the whole range of human color perception. All the monochromatic colors are distributed around the curved edge of the region, defined by a spectral locus that is joined by a line of purples. All perceivable colors lie within the shark-fin-shaped region on the chromaticity diagram. Points outside the region are not representing colors to the human eye. The triangle located within the region and defined by the three primary colors, red, green and blue (R, G, B), represents the perceived colors that can be matched by mixing the three primary colors. The extent, or gamut, of the colors that can be matched by mixtures from a given set of three primary colors is given on the chromaticity diagram by a triangle whose vertices are the chromaticity values of the three primary colors.

Any color on the CIE (x, y) chromaticity diagram can be considered to be a projection from the three-dimensional space of the three CIE tristimulus values (X, Y, Z) to the two-dimensional plane of the two CIE chromaticity values (x, y). The CIE tristimulus values (X, Y, Z), which are always non-negative, can represent all perceivable colors. In addition, the Y tristimulus value determines the luminance of a light source, while the (x, y) chromaticity values determine the color of a light source. The CIE tristimulus values (X, Y, Z) can be derived from the spectral power density (SPD) of a colored object using the three corresponding color matching functions defined in the wavelength domain. Different combinations of light wavelengths that result in the same set of CIE tristimulus values will be indistinguishable to the human eye.

Another characteristic of color inherently distinguishable by the human eye is known as the color temperature of a light source. Color temperature is characterized in color science by the temperature, in degrees Kelvin (K), of a black-body radiator which radiates the color light with the same color perceived by the human eye as the white light from a given source. Correlated color temperature (CCT) extends the idea to include light sources that can be closely but not exactly matched by a black-body radiator. Referring again to FIG. 1, a Planckian (white) locus represents temperatures of white ranging from about 1500K to about 10000K. For example, early morning daylight has a correlated color temperature of about 3000K (D30) and has a relatively reddish tone. An overcast midday sky has a correlated color temperature of about 10000K (D100) and has a relatively bluish tone. In the discussions that follow, correlated color temperature is implied when the term color temperature is used.

Through observation, it is known that the brightness and color temperature of the ambient light of the viewing environment and the brightness and color temperature of a displayed image affects the perceived picture quality of a display device. To provide the optimum perceived picture quality, the color temperature of the displayed image on the screen can be adjusted in accordance with the brightness and color temperature of the ambient light. One known method of improving perceived picture quality is to equalize a displayed color image based on the color temperature of the ambient light by adjusting the intensities of the individual primary color components used in the display device (e.g., RGB) based on the color temperature of the ambient light.

In addition, subjective test results indicate that the human eye can distinguish differences in brightness, i.e., luminance, down to about 1% to 2% of the diffuse white, which refers to the luminance of a diffusely reflecting white surface in a scene, and that the human eye is most acutely sensitive to changes in brightness in dark images. Tests reveal that contrast sensitivity and luminance discrimination thresholds are best modeled by a nonlinear function such as a logarithmic or a power-law transfer function having a gamma value ($\gamma$) of less than one.

Figure 2:
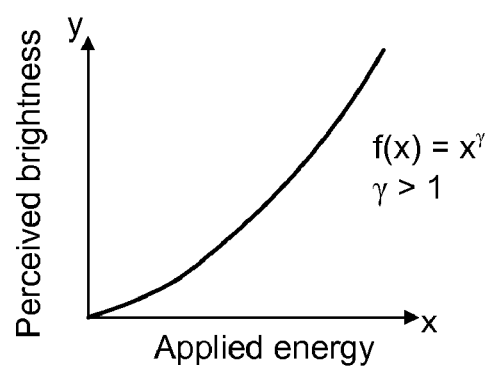
FIG. 2 is a typical luminance curve for a display device.

In world-wide video standards for analog television, e.g., ITU-R BT.470, and digital television, e.g., ITU-R BT.709, a power-law transfer function having a gamma value of between 0.4 and 0.5 is assumed in the video coding at the capture source, i.e., the camera. After applying the nonlinear power-law transfer function, the analog or digital electronic video signal is referred to as gamma pre-corrected signals. The gamma value, $\gamma$, of the display device for which the gamma pre-corrected video signal is intended to be displayed is assumed to be approximately between 2.2 and 2.8. The gamma value of the display device is defined as the slope of the logarithm of the luminance curve as a function of the logarithm of the input video signal amplitude when the brightness control of the display is set so as to make the luminance curve as straight as possible over a luminance range corresponding to a contrast as high as possible. FIG. 2 illustrates a typical luminance curve for a display device, where the curve, f(x), is characterized by:

$$f(x)=x^{\gamma}$$

As stated above, most typical display devices are preconfigured by the device manufacturer to have luminance curves, gamma values, color chromaticity values, and color temperatures set to predetermined nominal settings. These predetermined nominal settings are not necessarily device specific and are difficult to attain due to variations in manufacturing practices, such as quality control, that can affect the underlying display mechanisms of the device. Thus, the measured luminance curves, gamma values, color chromaticity values, and color temperatures of typical mass-produced display devices often do not reflect the expected values. Rather, they typically are inaccurate and inconsistent; and the luminance curves exhibit uneven behavior, which is highly undesirable.

To address this serious concern, a version of the present invention provides a calibration system that calculates correction values that can be used to adjust the input video signal such that a measured luminance curve of a display device has a desired predetermined gamma value and a displayed color has predetermined chromaticity values and color temperature. In one version, the calibration system can calculate more than one set of correction values so that the display device can be characterized by more than one gamma value and more than one set of chromaticity values and color temperature. This is desirable in order to achieve optimum perceived image quality under different viewing conditions and input video signal characteristics.

In a preferred embodiment, the calibration system calculates, for a plurality of gray levels above a threshold gray level, how much the relative intensity of each primary color component used by the display device should be adjusted in order to fix chromaticity values to a predetermined target point on the chromaticity diagram and to fix the gamma value of the luminance curve to a target gamma value simultaneously. The adjustment values are used to calculate correction values that are loaded into a plurality of lookup tables in the display device and are used to correct an input video signal during operation.

Figure 3:
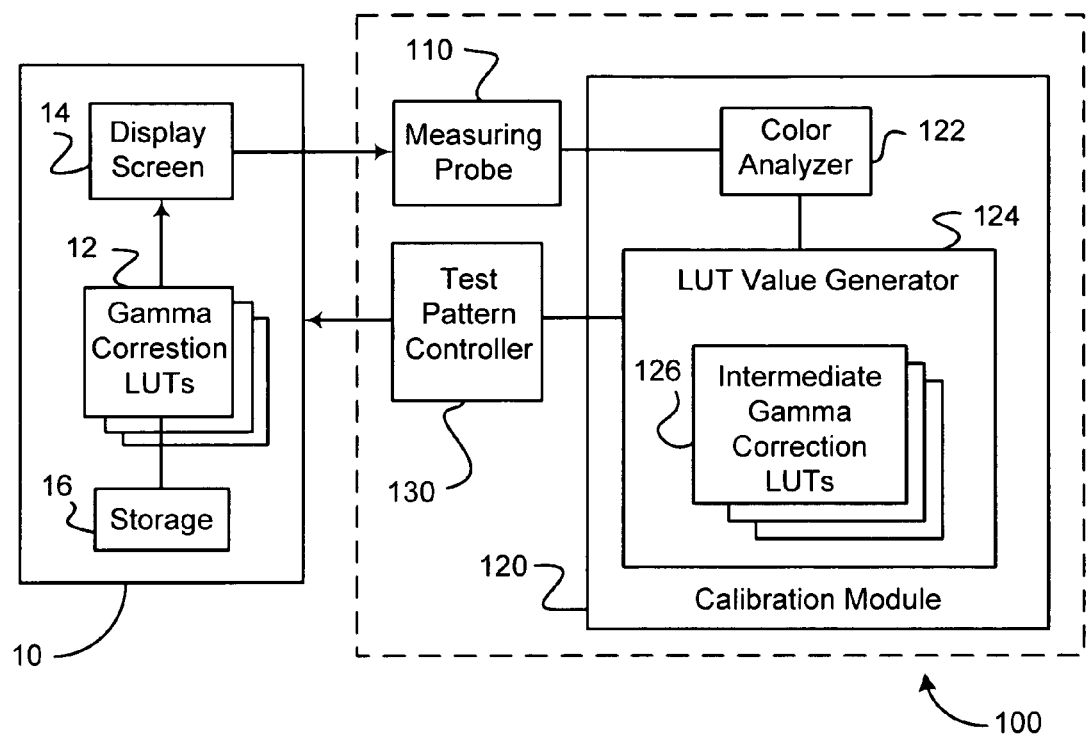
FIG. 3 is a block diagram of the calibration system coupled to a display device according to a version of the present invention.

FIG. 3 is a block diagram of the calibration system 100 coupled to a display device 10 according to a version of the present invention. According to one version of the present invention, the display device 10 includes a plurality of embedded gamma correction LUTs 12 having outputs coupled to a display screen 14 and a storage mechanism 16 coupled to the embedded gamma correction LUTs 12. In another version, the plurality of embedded gamma correction LUTs 12 can be external to the display device 10, e.g., in a video processor module of a display system (not shown) that utilizes the display device 10, such as a television. Each primary color component is associated with one of the plurality of embedded LUTs 12. Correction values are loaded from the storage mechanism 16 into the embedded LUTs 12 and are used to adjust an input video signal so that the display device accurately reproduces the luminance and color of the input image. The correction values are determined by the calibration system 100 during a calibration process.

The calibration system 100 includes a measuring probe 110, a calibration module 120 and a test pattern controller 130. The test pattern controller 130 is capable of generating a video signal corresponding to a known test pattern, and is directly coupled to the display device 10, such that the display device 10 displays the input video signal, i.e., the test pattern, on the display screen 14. The test pattern controller 130 is capable of generating specific primary color (R, G, B) component values. In one version, the test pattern controller 130 can be a computer graphics card known in the art. Alternatively, the test pattern controller 130 can be a known pattern generator. The video signal generated by the test pattern controller 130 can be received directly by the display screen 14, thereby bypassing the embedded LUTs 12. In another version, the video signal can be inputted into the embedded LUTs 12.

The measuring probe 110 is capable of measuring luminance and color property data of the light emitted from the surface of the display screen 14 when it displays the input video signal, i.e., the test pattern. The measuring probe 110 is coupled to the calibration module 120, which includes a color analyzer 122 and a lookup table (LUT) value generator 124. The color analyzer 122 of the calibration module 120 analyzes the luminance and color property data and calculates luminance levels and color tristimulus values corresponding to the measured data. The LUT value generator 124 includes a plurality of intermediate gamma correction LUTs 126 that store intermediate LUT values. In a preferred embodiment, each primary color component is associated with one of the plurality of intermediate gamma correction LUTs 126. During the calibration process, the LUT value generator 124 uses the measured luminance levels and color tristimulus values to calculate appropriate correction values for the embedded gamma correction LUTs 12.

Figure 4:
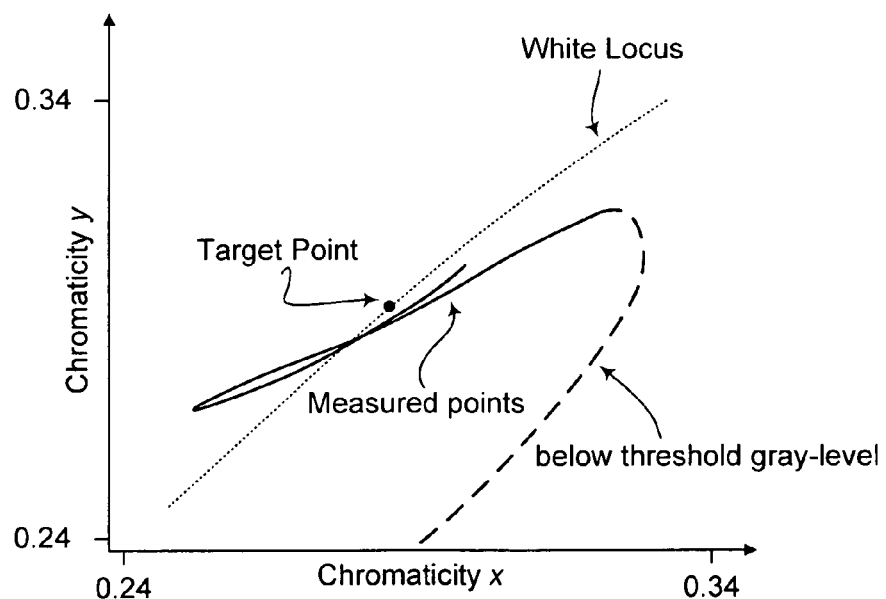
FIG. 4 is a graph illustrating the chromaticity trajectory of a display device that has not been calibrated.

In a calibrated system, the measured chromaticity point on the chromaticity diagram corresponding to all gray levels above a threshold gray level should fall on or near a predetermined target chromaticity point on the white locus. Below the threshold gray level, which is approximately 10% to 20% of the maximum gray level, the behavior of the measured chromaticity points is more erratic and less predictable. The behavior of the display screen 14 below the threshold gray level is less controllable by its inputs from the embedded gamma correction LUTs 12, therefore, the calibration process is not effective in these gray levels. In an uncalibrated system, the measured chromaticity points on the chromaticity diagram corresponding to the gray levels above the threshold gray level are scattered, as illustrated in FIG. 4, and the measured color temperature can deviate from the target color temperature by as much as 5,000K. This is referred to as gray-level color deviation, which significantly degrades the perceived image quality of the display device.

According to a version of the present invention, the values for the embedded gamma correction LUTs 12 are calculated by analyzing the measured luminance levels Y and chromaticity values (x, y) corresponding to a plurality of gray levels and determining for each gray level a corresponding measured chromaticity point on the chromaticity diagram. The LUT value generator 124 determines, for each measured chromaticity point, the differential change in each primary color component value needed to move the measured chromaticity point to the target chromaticity point. The LUT value generator 124 then calculates the correction value of each primary color component for each gray level so that the target chromaticity values and the target luminance levels are matched throughout the gray levels above the threshold simultaneously. When this is completed, the display device 10 accurately reproduces the luminance and color properties of the input signal and the perceived image quality is optimized.

Figure 5:
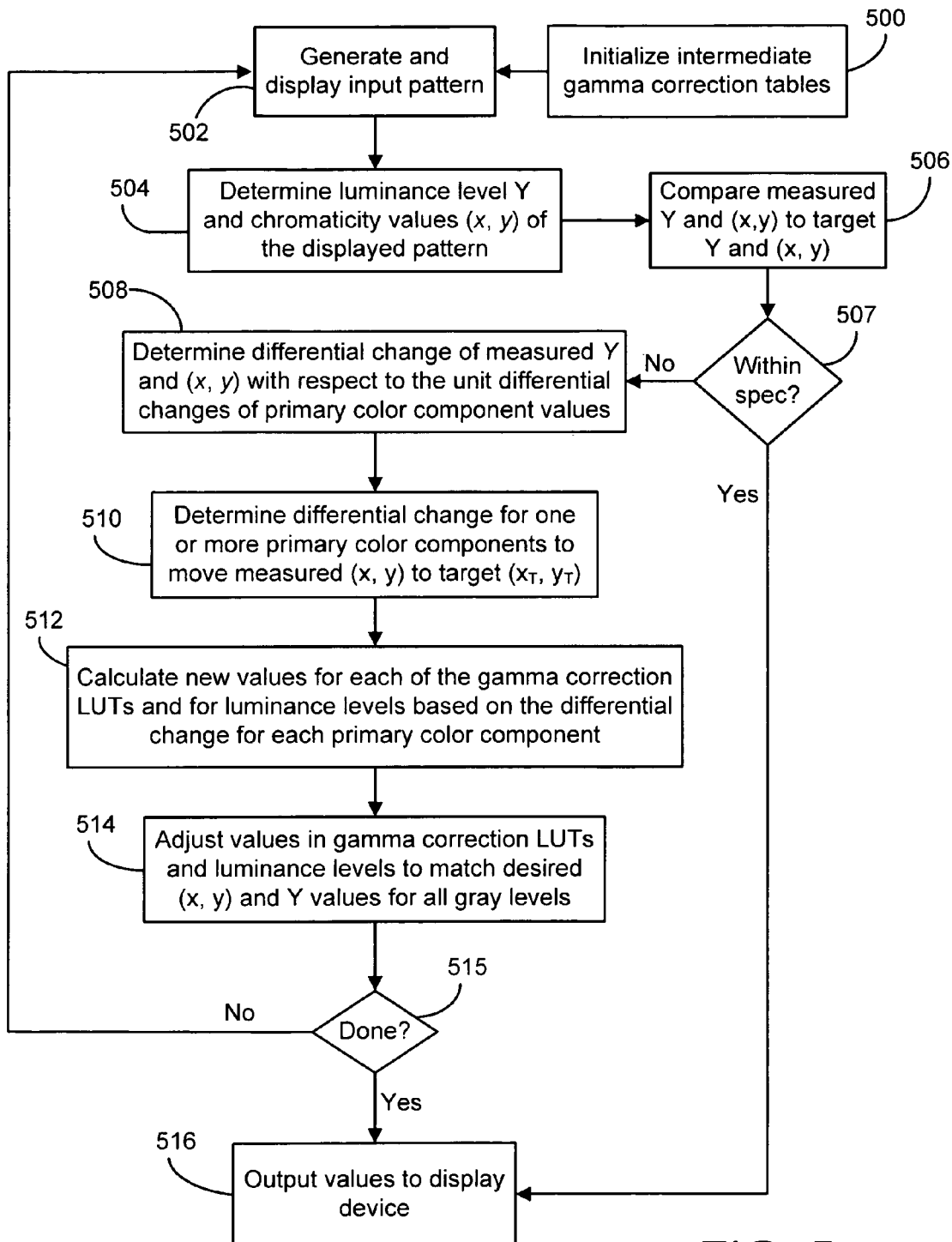
FIG. 5 is a flowchart illustrating a calibration process performed by the calibration system according to a version of the present invention.
Figure 6A:
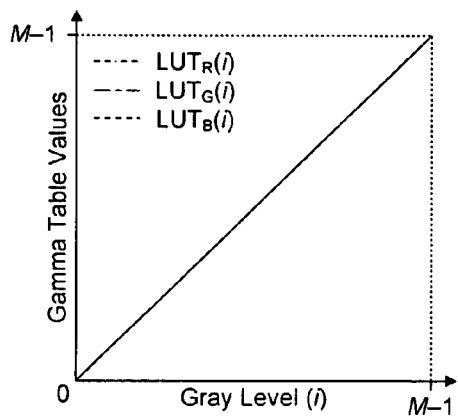
FIG. 6A and FIG. 6B are graphs showing initial values for the three intermediate gamma correction LUTs corresponding to red, green, and blue primary color components versus gray level and the measured luminance levels before calibration and a target luminance curve versus gray level, respectively.

FIG. 5 is a flowchart illustrating the calibration process performed by the calibration system 100 shown in FIG. 3 according to a version of the present invention. Referring to FIG. 3 and FIG. 5, the calibration process begins by initializing the intermediate gamma correction LUTs 126 with a linearly increasing function:

$LUT_R(i)=i$, $LUT_G(i)=i$, $LUT_B(i)=i$, where i=0, 1, . . . , M−1 and M is the number of gray levels for each of the R, G, and B sub-pixels of the display screen 14 (step 500). Typically, for 8-bit pixel data, M is equal to 256, and for 10-bit data, M is equal to 1024. FIG. 6A is a graph showing the initial values for the three corresponding intermediate gamma correction LUTs versus gray level, i.

After the intermediate gamma correction LUTs 126 have been initialized, the test pattern controller 130 generates R, G, and B component values corresponding to a plurality of test patterns and transmits the test patterns to the display device 10, which displays the test patterns on the screen 14 (step 502). Each displayed test pattern is preferably a white color corresponding to a selected gray level, k.

According to one version, the output of the test pattern controller 130 can be connected to the inputs of the embedded gamma correction tables 12. In this configuration, the values of the intermediate gamma correction LUTs 126, e.g., $LUT_R(i)$, $LUT_G(i)$, $LUT_B(i)$, can be loaded into the corresponding embedded gamma correction LUTs 12 and the test pattern controller 130 can be directed to generate R, G, and B component outputs (k, k, k), where k are selected gray levels. Alternatively, the values of the embedded gamma correction LUTs 12 can be (i, i, i), where i=0, 1, . . . , M−1, and the test pattern controller 130 can be directed to generate R, G, and B component outputs corresponding to the values of the intermediate gamma correction LUTs 126 for k, e.g., $LUT_R(k)$, $LUT_G(k)$, $LUT_B(k)$, where k are selected gray levels.

According to another version, the output of the test pattern controller 130 can be connected directly to the inputs of the display screen 14. In this configuration, the test pattern controller 130 can be directed to generate R, G, and B component outputs corresponding to the values of the intermediate gamma correction LUTs 126 for k, e.g., $LUT_R(k)$, $LUT_G(k)$, $LUT_B(k)$, where k are selected gray levels.

Figure 6B:
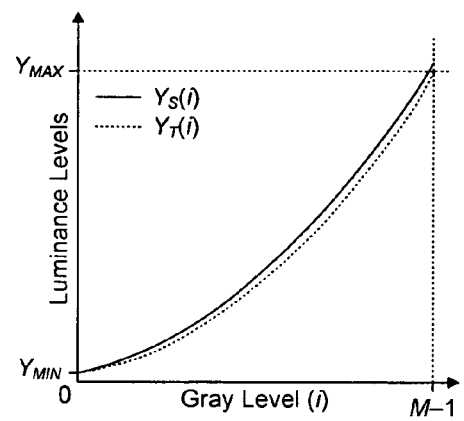

For every displayed test pattern, e.g., a displayed white color corresponding to the selected gray level, the luminance level Y(k) and chromaticity values [x(k), y(k)] are determined (step 504). In particular, the measuring probe 110 measures the luminance and color property data of the displayed test pattern and the color analyzer 122 converts the luminance and color property data into the CIE tristimulus values (X, Y, Z), which in turn are used to calculate the chromaticity values (x, y). FIG. 6B is a graph showing the measured luminance curve before calibration and a target luminance curve versus gray level. In one version, the calibration system 100 determines the following values for each selected gray level k:

$Y(k)=Y[LUT_R(k), LUT_G(k), LUT_B(k)], 0 \leq k \leq M-1$;

$x(k)=x[LUT_R(k), LUT_G(k), LUT_B(k)], 0 \leq k \leq M-1$;

$y(k)=y[LUT_R(k), LUT_G(k), LUT_B(k)], 0 \leq k \leq M-1$;

where Y[•], x[•], and y[•] are the unknown underlying functions of the three component values at the inputs of the display screen 14 in the display device 10 under test.

The LUT value generator 124 receives the measured luminance levels and chromaticity values and compares each set to a predetermined target luminance level $Y_T(k)$ and a predetermined target chromaticity point $(x_T, y_T)$ (step 506) to determine whether the deviation between the measured values and target values fall within an allowable tolerance (step 507). In a preferred embodiment, the target luminance level corresponds to that on a luminance curve having a predetermined target gamma value, e.g., of about 2.2. The target chromaticity point is preferably a white point corresponding to a particular color temperature, e.g., of about 6500K. Different target luminance curves and different target chromaticity points can be selected in order to calibrate the display device 10 to suit different viewing environments and input video signal characteristics. For example, the target chromaticity point can be selected to correspond to a warmer or cooler color temperature so that the perceived image quality is maintained in warmer or cooler ambient lighting conditions.

The allowable tolerance for the deviation between measured and target luminance levels is preferably within ±1%, while the allowable tolerance for the deviation between measured and target chromaticity points is preferably within (±0.002, ±0.002). The tolerance values can be increased or decreased depending on the degree of accuracy required. Nevertheless, depending on the quality of the display device itself, small tolerances might not be attainable. In typical cases, with the tolerances suggested above, after the completion of the calibration process, the measured luminance levels can match the targeted levels to within ±1%, while the measured chromaticity points can fall within (±0.002, ±0.002) of the target chromaticity point and the measured color temperature can fall within ±100K of the target color temperature.

If the deviations of the measured luminance levels and chromaticity values are within the allowable tolerances (step 507), then the display device 10 satisfies the calibration standards. The values in the intermediate gamma correction LUTs 126 are outputted and stored in the display device 10 (step 516), and the calibration process is completed.

If the deviations of the measured luminance levels and chromaticity values are not within the allowable tolerances (step 507), then the LUT value generator 124 calculates updated values for the intermediate gamma correction LUTs 126. First, the LUT value generator 124 determines the differential change of measured luminance levels Y and the differential change of measured chromaticity values (x, y) when each primary color component value is increased and decreased a unit differential amount (step 508). In particular, for each selected gray level, the test pattern controller 130 generates R, G and B component output values that include a predetermined differential change from the previous corresponding component output values for each selected gray level. These test patterns are displayed by the display device 10 and the luminance levels and chromaticity values are measured.

In one version, the calibration system 100 determines the following values for each selected gray level k:

$$Y_{R+}(k)=Y[\min(LUT_R(k)+\Delta R, M-1), LUT_G(k), LUT_B(k)], 0 \leq k \leq M-1;$$

$$x_{R+}(k)=x[\min(LUT_R(k)+\Delta R, M-1), LUT_G(k), LUT_B(k)], 0 \leq k \leq M-1;$$

$$y_{R+}(k)=y[\min(LUT_R(k)+\Delta R, M-1), LUT_G(k), LUT_B(k)], 0 \leq k \leq M-1;$$

$$Y_{R-}(k)=Y[\max(LUT_R(k)-\Delta R, 0), LUT_G(k), LUT_B(k)], 0 \leq k \leq M-1;$$

$$x_{R-}(k)=x[\max(LUT_R(k)-\Delta R, 0), LUT_G(k), LUT_B(k)], 0 \leq k \leq M-1;$$

$$y_{R-}(k)=y[\max(LUT_R(k)-\Delta R, 0), LUT_G(k), LUT_B(k)], 0 \leq k \leq M-1;$$

$$Y_{G+}(k)=Y[LUT_R(k), \min(LUT_G(k)+\Delta G, M-1), LUT_B(k)], 0 \leq k \leq M-1;$$

$$x_{G+}(k)=x[LUT_R(k), \min(LUT_G(k)+\Delta G, M-1), LUT_B(k)], 0 \leq k \leq M-1;$$

$$y_{G+}(k)=y[LUT_R(k), \min(LUT_G(k)+\Delta G, M-1), LUT_B(k)], 0 \leq k \leq M-1;$$

$$Y_{G-}(k)=Y[LUT_R(k), \max(LUT_G(k)-\Delta G, 0), LUT_B(k)], 0 \leq k \leq M-1;$$

$$x_{G-}(k)=x[LUT_R(k), \max(LUT_G(k)-\Delta G, 0), LUT_B(k)], 0 \leq k \leq M-1;$$

$$y_{G-}(k)=y[LUT_R(k), \max(LUT_G(k)-\Delta G, 0), LUT_B(k)], 0 \leq k \leq M-1;$$

$$Y_{B+}(k)=Y[LUT_R(k), LUT_G(k), \min(LUT_B(k)+\Delta B, M-1)], 0 \leq k \leq M-1;$$

$$x_{B+}(k)=x[LUT_R(k), LUT_G(k), \min(LUT_B(k)+\Delta B, M-1)], 0 \leq k \leq M-1;$$

$$y_{B+}(k)=y[LUT_R(k), LUT_G(k), \min(LUT_B(k)+\Delta B, M-1)], 0 \leq k \leq M-1;$$

$$Y_{B-}(k)=Y[LUT_R(k), LUT_G(k), \max(LUT_B(k)-\Delta B, 0)], 0 \leq k \leq M-1;$$

$$x_{B-}(k)=x[LUT_R(k), LUT_G(k), \max(LUT_B(k)-\Delta B, 0)], 0 \leq k \leq M-1;$$

$$y_{B-}(k)=y[LUT_R(k), LUT_G(k), \max(LUT_B(k)-\Delta B, 0)], 0 \leq k \leq M-1;$$

where $\Delta R$, $\Delta G$, and $\Delta B$ are the predetermined differential change in the R, G, and B component output values, respectively.

The measured values at selected gray levels k are then smoothened and interpolated over all the gray levels i, using well known curve-fitting and interpolation operations to reduce the sensitivity of the calibration algorithm to small errors in the measured data. The smoothened functions are then used to calculate the differential change in luminance level and in chromaticity values due to a unit differential change in each of the primary color components:

$$dY_R(i)=[Y_{SR+}(i)-Y_{SR-}(i)]/[\min(LUT_R(i)+\Delta R, M-1)-\max(LUT_R(i)-\Delta R, 0)],$$

$$dY_G(i)=[Y_{SG+}(i)-Y_{SG-}(i)]/[\min(LUT_G(i)+\Delta G, M-1)-\max(LUT_G(i)-\Delta G, 0)],$$

$$dY_B(i)=[Y_{SB+}(i)-Y_{SB-}(i)]/[\min(LUT_B(i)+\Delta B, M-1)-\max(LUT_B(i)-\Delta B, 0)],$$

$$dx_R(i)=[x_{SR+}(i)-x_{SR-}(i)]/[\min(LUT_R(i)+\Delta R, M-1)-\max(LUT_R(i)-\Delta R, 0)],$$

$$dx_G(i)=[x_{SG+}(i)-x_{SG-}(i)]/[\min(LUT_G(i)+\Delta G, M-1)-\max(LUT_G(i)-\Delta G, 0)],$$

$$dx_B(i)=[x_{SB+}(i)-x_{SB-}(i)]/[\min(LUT_B(i)+\Delta B, M-1)-\max(LUT_B(i)-\Delta B, 0)],$$

$$dy_R(i)=[y_{SR+}(i)-y_{SR-}(i)]/[\min(LUT_R(i)+\Delta R, M-1)-\max(LUT_R(i)-\Delta R, 0)],$$

$$dy_G(i)=[y_{SG+}(i)-y_{SG-}(i)]/[\min(LUT_G(i)+\Delta G, M-1)-\max(LUT_G(i)-\Delta G, 0)],$$

$$dy_B(i)=[y_{SB+}(i)-y_{SB-}(i)]/[\min(LUT_B(i)+\Delta B, M-1)-\max(LUT_B(i)-\Delta B, 0)].$$

where $Y_{SR+}(i)$, for all the gray levels i, is the smoothened functions corresponding to $Y_{R+}(k)$, for the selected gray levels k, so are the relationships between the other smoothened and measured quantities.

The differential changes in luminance levels and chromaticity values above can be used to define gradient vectors associated with each primary color component. That is:

$$dR(i)=dx_R(i)x+dy_R(i)y,$$

$$dG(i)=dx_G(i)x+dy_G(i)y,$$

$$dB(i)=dx_B(i)x+dy_B(i)y,$$

where x and y are unit vectors on the chromaticity diagram along the x-axis and the y-axis, respectively. Each gradient vector describes how a chromaticity point will move due to a unit differential change in the associated primary color component value.

The gradient vectors are then used to determine the differential change needed in one or more primary color component values in order to move the measured chromaticity point on the chromaticity diagram to the target chromaticity point (step 510). In one version, the LUT value generator 124 calculates the minimum-norm vectors that can move the measured chromaticity point $(x_S, y_S)$ on the chromaticity diagram to the target point $(x_T, y_T)$ for every gray level, i, above the threshold gray level. Let $dR(i)$, $dG(i)$, and $dB(i)$ be the differential changes in each of the three primary color component values at gray level i, respectively. The following two equations describe moving the measured chromaticity point $[x_S(i), y_S(i)]$ to the predetermined target point $(x_T, y_T)$:

$$dx_R(i)dR(i)+dx_G(i)dG(i)+dx_B(i)dB(i)=C(i)[x_T-x_S(i)],$$

$$dy_R(i)dR(i)+dy_G(i)dG(i)+dy_B(i)dB(i)=C(i)[y_T-y_S(i)],$$

where $C(i)$ is a predetermined chromaticity adjustment curve that smoothly fades out the adjustment at the low gray levels, i.e., $C(0)=0$ and $C(M-1)=1$. For such an underdetermined system of linear equations, an infinite number of solutions exist. In a preferred embodiment, the unique solution $[dR^*(i), dG^*(i), dB^*(i)]$ that has a minimum squared norm among all valid solutions is selected.

Let $P_1(i)=[dR_1(i), dG_1(i), dB_1(i)]$ and $P_2(i)=[dR_2(i), dG_2(i), dB_2(i)]$ be two solutions where one of the different variables in each solution is zero, e.g., $dR_1(i)=0$ and $dG_2(i)=0$. The optimal solution point $P^*(i)=[dR^*(i), dG^*(i), dB^*(i)]$ on a solution line including $P_1(i)$ and $P_2(i)$ is that point nearest to the origin. According to the orthogonality principle, a vector from the origin to the optimal solution $P^*(i)$ should be orthogonal to a vector along the solution line. Using this principle, the optimal solution point is:

$$P^*(i)=[dR^*(i), dG^*(i), dB^*(i)]=P_1(i)+\alpha^*(i)[P_2(i)-P_1(i)], \text{ i.e.,}$$

$$dR^*(i)=dR_1(i)+\alpha^*(i)[dR_2(i)-dR_1(i)],$$

$$dG^*(i)=dG_1(i)+\alpha^*(i)[dG_2(i)-dG_1(i)],$$

$$dB^*(i)=dB_1(i)+\alpha^*(i)[dB_2(i)-dB_1(i)],$$

where $\alpha^*(i)$ is the orthogonality factor:

$$\begin{aligned}\alpha^*(i) &= P_1(i)\cdot[P_1(i)-P_2(i)]/|P_1(i)-P_2(i)|^2 \\ &= \{dR_1(i)[dR_1(i)-dR_2(i)]+dG_1(i)[dG_1(i)-dG_2(i)]+ \\ &\quad +dB_1(i)[dB_1(i)-dB_2(i)]\}/\{[dR_1(i)-dR_2(i)]^2+ \\ &\quad [dG_1(i)-dG_2(i)]^2+[dB_1(i)-dB_2(i)]^2\}.\end{aligned}$$

Once the differential changes to one or more of the primary color component values are determined for each gray level, updated values for each of the intermediate gamma correction LUTs 126 are calculated for each gray level (step 512) according to the following expressions:

Note that $LUT_R(i)$, $LUT_G(i)$, and $LUT_B(i)$ at the right of the equal sign are the old values, while those at the left are the corresponding updated values.

$$LUT_R(i)=\max\{\min[LUT_R(i)+dR^*(i), M-1], 0\},$$

$$LUT_G(i)=\max\{\min[LUT_G(i)+dG^*(i), M-1], 0\},$$

$$LUT_B(i)=\max\{\min[LUT_B(i)+dB^*(i), M-1], 0\},$$

In a preferred embodiment, updated luminance levels are also calculated according to the following expression, where $Y_S(i)$ at the right of the equal sign is the old value, and that at the left is the updated value:

$$Y_S(i)=Y_S(i)+dY_R(i)dR^*(i)+dY_G(i)dG^*(i)+dY_B(i)dB^*(i).$$

Figure 7A:
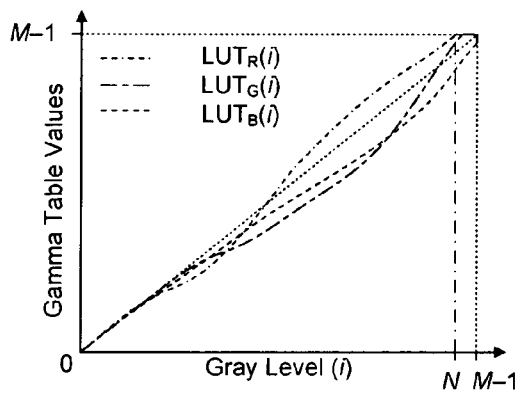
FIG. 7A and FIG. 7B are graphs showing updated values for the three intermediate gamma correction LUTs, i.e., $LUT_R(i)$, $LUT_G(i)$, and $LUT_B(i)$, versus gray level and updated luminance levels $Y_s(i)$ versus gray level.
Figure 7B:
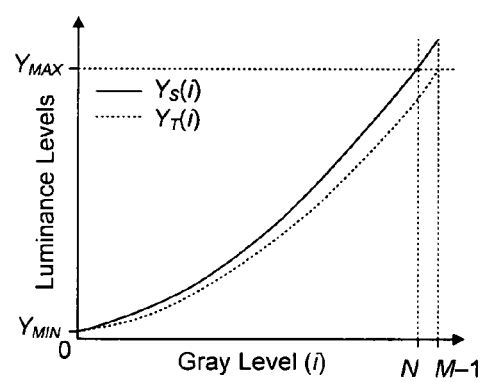

FIG. 7A is a graph showing the updated values of the intermediate gamma correction LUTs 126, i.e., $LUT_R(i)$, $LUT_G(i)$, $LUT_B(i)$, versus gray level and FIG. 7B is a graph showing the updated luminance levels $Y_S(i)$ versus gray level. In FIG. 7A, the updated values $LUT_R(i)$, $LUT_G(i)$, $LUT_B(i)$ noticeably deviate from the initial linear function above the threshold gray level of about 10% to 20% of the maximum gray level, which is indicative of the degree to which the input video signal should be adjusted in order to substantially eliminate gray-level color deviations of the display device 10.

In FIG. 7A, at higher gray level values, the LUT values for at least one of the primary color components begin to saturate (at a maximum value of $M-1$) at a gray level N less than the maximum gray level, $M-1$. Similarly, in FIG. 7B, at higher gray level values, the luminance levels $Y_S(i)$ increase smoothly and reach a maximum luminance value $Y_{max}$ at a gray level N, which is less than the maximum gray level, $M-1$. Smooth increasing of the luminance levels $Y_S(i)$ beyond the maximum luminance value $Y_{max}$ is not attainable by the display screen 14 because at least one of the primary color components saturate beyond the gray level N. In order to match desired chromaticity values and luminance levels for each of the gray levels, including those beyond the gray level N, the values in the intermediate gamma correction LUTs 126 are adjusted (step 514).

In one version, the LUT values are adjusted in the following manner. Firstly, a maximum luminance level $Y_{MAX}$ is calculated at a gray level N where the LUT values for at least one of the intermediate gamma correction LUTs 126 start to saturate at the maximum value of $M-1$. In addition, a minimum luminance level $Y_{MIN}$ is calculated where the LUT values for all the intermediate gamma correction LUTs 126 equal zero (0). Secondly, for each valid index i of the intermediate gamma correction LUTs 126, set a target luminance value $Y_T(i)$ to:

$$Y_T(i)=L(i)[(Y_{MAX}-Y_{MIN})\gamma_T(i)+Y_{MIN}]+[1-L(i)]Y_S(i),$$

where $L(i)$ is a predetermined luminance adjustment curve that smoothly fades out the adjustment at the low gray level portion, i.e., $L(0)=0$ and $L(M-1)=1$, and $\gamma_T(i)$ is a normalized target luminance curve typically represented by a gamma function with a predetermined gamma value, i.e., $\gamma_T(i)=[i/(M-1)]^\gamma$, $i=0, 1, \ldots, M-1$. Thirdly, for each valid index i of the intermediate gamma correction LUTs 126, search an index j such that:

$$Y_S(j)\leq Y_T(j)<Y_S(j+1)$$

and calculate a fractional adjustment factor:

$$F(i)=[Y_T(i)-Y_S(j)]/[Y_S(j+1)-Y_S(j)].$$

Figure 8A:
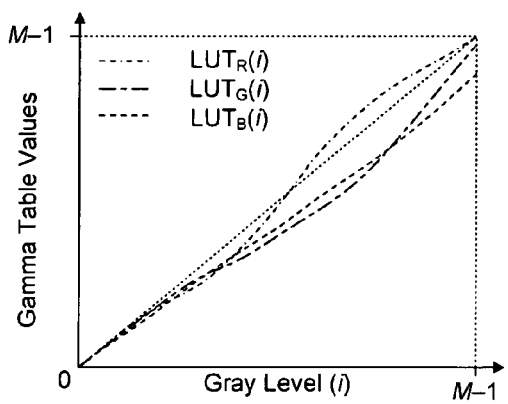
FIG. 8A and FIG. 8B are graphs showing adjusted values of the three intermediate gamma correction LUTs versus gray level and the luminance levels after calibration versus gray level, respectively.
Figure 8B:
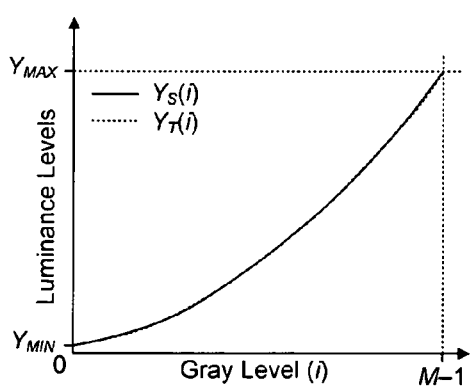

The values in each of the intermediate gamma correction LUTs 126 and the luminance levels are then adjusted by the following expressions, where $LUT_R(i)$, $LUT_G(i)$, $LUT_B(i)$, and $Y_S(i)$ at the right of the equal sign are the updated values, while those at the left are the corresponding adjusted values:

$$LUT_R(i)=\text{round}[(1-F(i))LUT_R(j)+F(i)LUT_R(j+1)],$$

$$LUT_G(i)=\text{round}[(1-F(i))LUT_G(j)+F(i)LUT_G(j+1)],$$

$$LUT_B(i)=\text{round}[(1-F(i))LUT_B(j)+F(i)LUT_B(j+1)],$$

$$Y_S(i)=[1-F(i)]Y_S(j)+F(i)Y_S(j+1),$$

where round[•] denotes rounding to the nearest integer number. FIG. 8A and FIG. 8B are graphs showing the adjusted values of the intermediate gamma correction LUTs 126 and luminance levels, respectively. At this stage in the calibration process, both the target chromaticity point and the target luminance curve are matched simultaneously.

After the intermediate gamma correction LUT values and luminance levels have been simultaneously adjusted (step 514), the calibration module 120 determines whether calibration process is done (step 515). For example, the number of times the calibration system 100 performs steps 502 through 514 can be set not to exceed a specified number. If the calibration process is not done (step 515), e.g., the number of iterations does not exceed the maximum number, the calibration system 100 repeats steps 502 through 514. In this iteration, the input test patterns to the display screen 14 are adjusted by the values in each of the intermediate gamma correction LUTs 126 and the displayed test patterns by the display screen 14 correspond to the adjusted primary color components.

If the calibration process is done (step 515), e.g., because the number of iterations equals the maximum number of iterations, the values in each of the intermediate gamma correction LUTs 126 are outputted and stored in the storage mechanism 16 of the display device 10 (step 516), and the calibration process is completed. In one version, before outputting the LUT values, the calibration module 120 can check slope, continuity, and monotonic properties for the LUT values of the intermediate gamma correction LUTs 126 throughout all valid indexes, and make necessary modifications if needed. In operation, the display device 10 can load the LUT values from the storage mechanism 16 into the embedded gamma correction LUTs 12.

Figure 9:
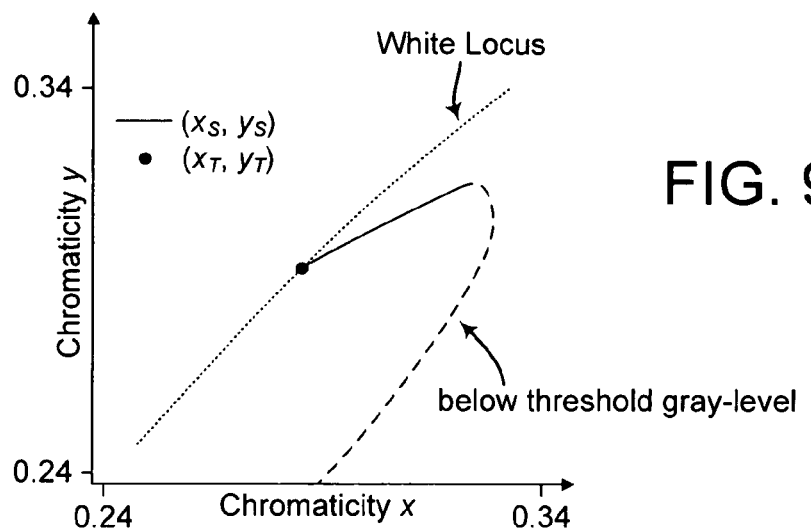
FIG. 9 is a graph showing the chromaticity trajectory after the calibration process according to a version of the present invention.

FIG. 9 is a graph showing the chromaticity trajectory after the calibration process. Comparing FIG. 9 to FIG. 4, after calibration, the measured chromaticity points fall on or near the target chromaticity point. Accordingly, the gray-level color temperature shift typically exhibited by a typical uncalibrated display device 10 (FIG. 4) is substantially eliminated after the calibration process according to the present invention.

In the calibration process described above, the chromaticity values are fixed to a target chromaticity point $(x_T, y_T)$ and the gamma value of the luminance curve is fixed to a target gamma value $\gamma_T$ throughout all gray levels above the threshold gray level. In another version, the chromaticity values can be fixed to a target chromaticity function $[x_T(i), y_T(i)]$ and the luminance levels can be fixed to a target luminance level function $Y_T(i)$.

Figure 10:
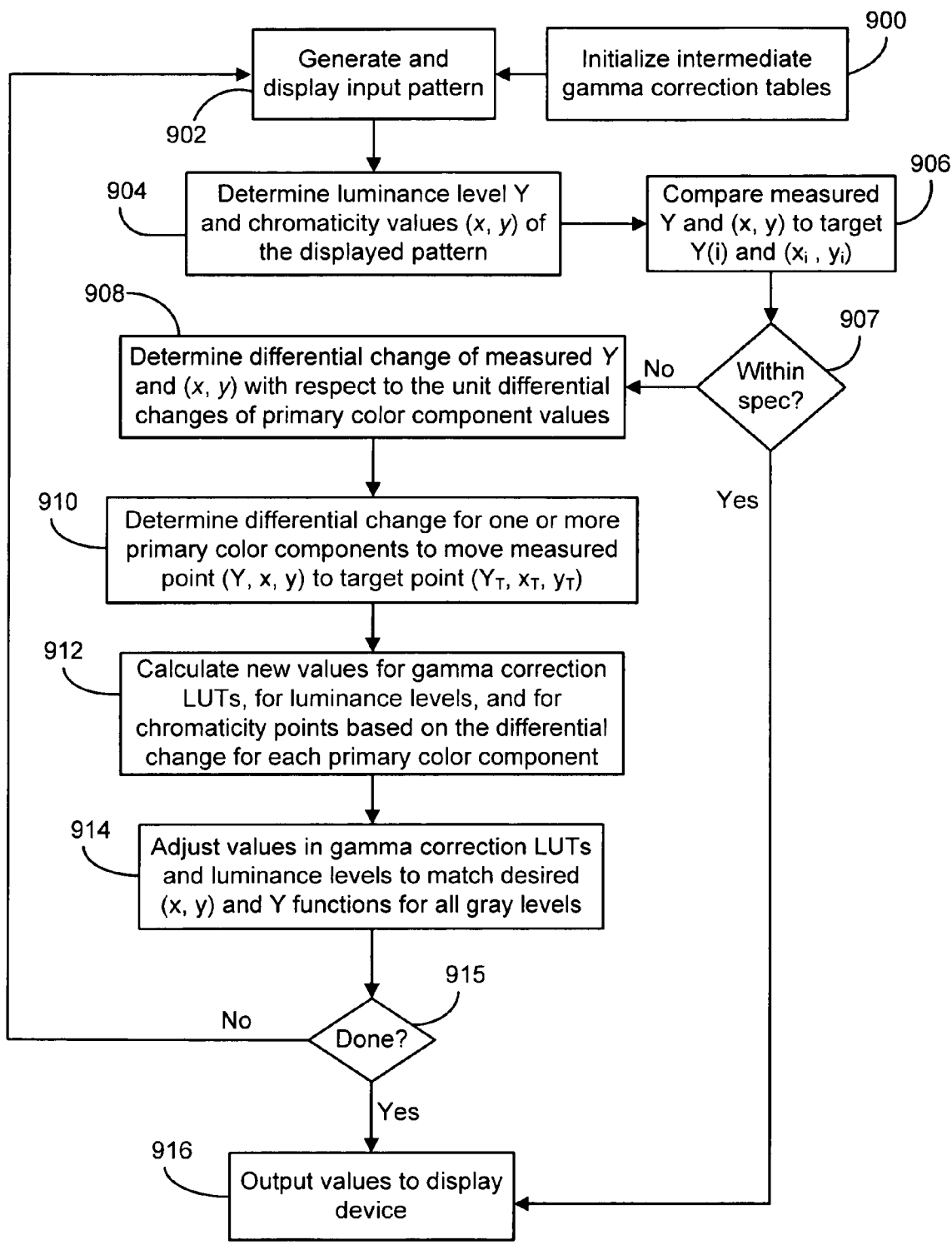
FIG. 10 is a flowchart illustrating a calibration process according to another version of the present invention.

FIG. 10 is a flowchart illustrating a calibration process according to this version of the present invention. Process steps 900 to 908 described in FIG. 10 are identical to process steps 500 through 508 in FIG. 5, and therefore, the discussion above relating to steps 500 through 508 will not be repeated here.

Figure 11:
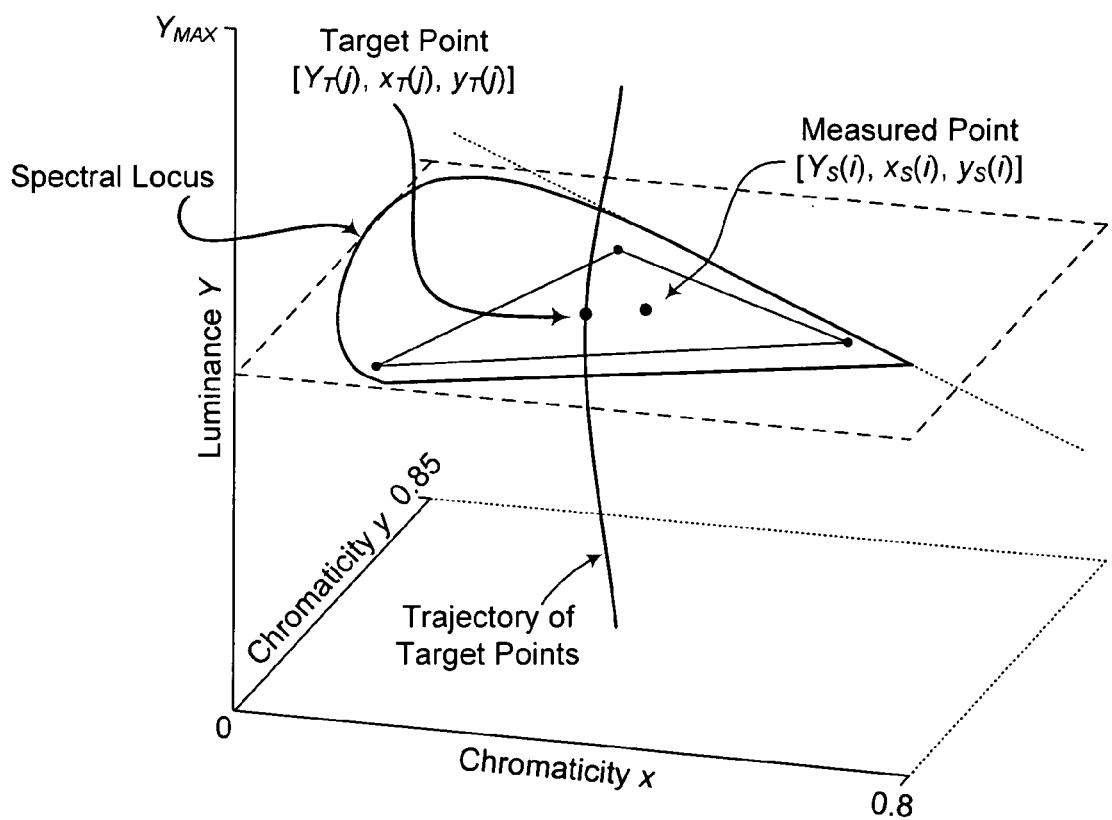
FIG. 11 illustrates a three-dimensional luminance-chromaticity diagram.

After step 908, the differential changes of luminance levels and chromaticity values with respect to a unit differential change in each of the primary color components are used to define gradient vectors representing how a measured point $[Y_S(i), x_S(i), y_S(i)]$ on a luminance-chromaticity diagram will move due to a unit differential change in one of the primary color component values. FIG. 11 illustrates a three-dimensional luminance-chromaticity diagram showing the measured point $[Y_S(i), x_S(i), y_S(i)]$ and a predetermined target point $[Y_T(j), x_T(j), y_T(j)]$. The gradient vectors are:

$$dR(i)=dY_R(i)Y+dx_R(i)x+dy_R(i)y,$$

$$dG(i)=dY_G(i)Y+dx_G(i)x+dy_G(i)y,$$

$$dB(i)=dY_B(i)Y+dx_B(i)x+dy_B(i)y,$$

where Y is the unit vector along the Y-axis, and x and y are unit vectors on the chromaticity diagram along the x-axis and the y-axis, respectively.

The gradient vectors are then used to determine the differential change needed in one or more primary color component values in order to move the measured luminance-chromaticity point to the target luminance-chromaticity point (step 910). In this version, the LUT value generator 124 calculates the minimum-norm vectors that can move the measured luminance-chromaticity point $[Y_S(i), x_S(i), y_S(i)]$ on the luminance-chromaticity diagram to the target point $[Y_T(j), x_T(j), y_T(j)]$ for every gray level, i, above the threshold gray level. If dR(i, j), dG(i, j), and dB(i, j) are the differential changes in the values of each of the intermediate gamma correction LUTs 126 at index i, respectively, in order to move the measured luminance-chromaticity point $[Y_S(i), x_S(i), y_S(i)]$ to the target point $[Y_T(j), x_T(j), y_T(j)]$, then the following three equations apply:

$$dY_R(i)dR(i,j)+dY_G(i)dG(i,j)+dY_B(i)dB(i,j)=L(j)Y_T(j)+[1-L(j)]Y_S(j)-Y_S(i),$$

$$dx_R(i)dR(i,j)+dx_G(i)dG(i,j)+dx_B(i)dB(i,j)=C(j)x_T(j)+[1-C(j)]x_S(j)-x_S(i),$$

$$dy_R(i)dR(i,j)+dy_G(i)dG(i,j)+dy_B(i)dB(i,j)=C(j)y_T(j)+[1-C(j)]y_S(j)-y_S(i),$$

where L(i) is a predetermined luminance adjustment curve that smoothly fades out the adjustment at the low gray levels, i.e., L(0)=0 and L(M−1)=1, and C(i) is a predetermined chromaticity adjustment curve that smoothly fades out the adjustment at the low gray levels, i.e., C(0)=0 and C(M−1)=1.

For each given i and j index, a unique solution exists. Thus, for each measured point $[Y_S(i), x_S(i), y_S(i)]$, the unique solution [dR*(i), dG*(i), dB*(i)] is calculated that has a minimum squared norm among all valid index j of a predetermined target point $[Y_T(j), x_T(j), y_T(j)]$, namely:

$$[dR^*(i), dG^*(i), dB^*(i)]=[dR(i,j^*), dG(i,j^*), dB(i,j^*)],$$

where j* is the optimal index of the optimal predetermined target point $[Y_T(j^*), x_T(j^*), y_T(j^*)]$ such that:

$$[dR(i,j^*)]^2+[dG(i,j^*)]^2+[dB(i,j^*)]^2 \leq [dR(i,j)]^2+[dG(i,j)]^2+[dB(i,j)]^2,$$

for all valid index j of a predetermined target point except j*. If more than one j* exists that achieves the minimum squared norm, the j* that is nearest to i is selected.

Once the differential changes to one or more of the primary color component values is determined for each gray level, updated values for each of the intermediate gamma correction LUTs 126, for the luminance levels, and for chromaticity values are calculated for each gray level (step 912) according to the following expressions, where $LUT_R(i), LUT_G(i), LUT_B$ (i), $Y_S(i)$, $x_S(i)$, and $y_S(i)$ at the right of the equal sign are the old values, and those at the left are the corresponding updated values:

$$LUT_R(i)=\max\{\min[LUT_R(i)+dR^*(i), M-1], 0\},$$

$$LUT_G(i)=\max\{\min[LUT_G(i)+dG^*(i), M-1], 0\},$$

$$LUT_B(i)=\max\{\min[LUT_B(i)+dB^*(i), M-1], 0\},$$

$$Y_S(i)=Y_S(i)+dY_R(i)dR^*(i)+dY_G(i)dG^*(i)+dY_B(i)dB^*(i),$$

$$x_S(i)=x_S(i)+dx_R(i)dR^*(i)+dx_G(i)dG^*(i)+dx_B(i)dB^*(i),$$

$$y_S(i)=y_S(i)+dy_R(i)dR^*(i)+dy_G(i)dG^*(i)+dy_B(i)dB^*(i).$$

In addition, the optimal index j* of the optimal predetermined target point for all valid indexes i of those tables is recorded as:

$$J_{OPT}(i) = \arg\min_j\{[dR(i,j)]^2 + [dG(i,j)]^2 + [dB(i,j)]^2\}$$

In order to match desired chromaticity functions $[x_T(j), y_T(j)]$ and the luminance function $Y_T(j)$ for each of the gray levels, the values in the intermediate gamma correction LUTs 126 are adjusted (step 914). In this version, the LUT values are adjusted in the following manner.

Firstly, the maximum index $j_{MAX}$ of the predetermined target point that can be matched when the updated values for at least one of the intermediate gamma correction tables 126 start to saturate at a maximum value of M-1 is determined. Secondly, for each index i of the intermediate gamma correction tables 126, an adjusted index $j_T$ of the predetermined target point is set in the following manner:

$$J_T(i)=i \cdot j_{MAX}/(M-1).$$

Thirdly, for each index i of the intermediate gamma correction tables 126, indices $k_1$ and $k_2$ are identified such that $J_{OPT}(k_1)$ and $J_{OPT}(k_2)$ have minimum difference among all pairs of indices $k_1$ and $k_2$ that can satisfy the following condition:

$$J_{OPT}(k_1) \leq J_T(i) \leq J_{OPT}(k_2).$$

The fractional adjustment factor is calculated:

$$F(i)=[J_T(i)-J_{OPT}(k_1)]/[J_{OPT}(k_2)-J_{OPT}(k_1)],$$

and then values for the intermediate gamma correction LUTs 126, the luminance levels, and the chromaticity values throughout all valid indexes of those tables are then adjusted according to the following expressions, where $LUT_R(i)$, $LUT_G(i)$, $LUT_B(i)$, $Y_S(i)$, $x_S(i)$, and $y_S(i)$ at the right of the equal sign are the updated values, and those at the left are the corresponding adjusted values.

$$LUT_R(i)=\text{round}[(1-F(i))LUT_R(k_1)+F(i)LUT_R(k_2)],$$

$$LUT_G(i)=\text{round}[(1-F(i))LUT_G(k_1)+F(i)LUT_G(k_2)],$$

$$LUT_B(i)=\text{round}[(1-F(i))LUT_B(k_1)+F(i)LUT_B(k_2)],$$

$$Y_S(i)=[1-F(i)]Y_S(k_1)+F(i)Y_S(k_2),$$

$$x_S(i)=[1-F(i)]x_S(k_1)+F(i)x_S(k_2),$$

$$y_S(i)=[1-F(i)]y_S(k_1)+F(i)y_S(k_2).$$

After the LUT values, luminance levels and chromaticity values have been simultaneously adjusted (step 914), the calibration module 120 determines whether calibration process is done (step 915), as described above. If the calibration process is not done, the calibration system 100 repeats steps 902 through 914. If the calibration process is done (step 915), the values in each of the intermediate gamma correction LUTs 126 are outputted and stored in the storage mechanism 16 of the display device 10 (step 916), and the calibration process is completed. In operation, the display device 10 can load the LUT values from the storage mechanism 16 into the embedded gamma correction LUTs 12.

As briefly mentioned above, the calibration system 100 according to the present invention can generate a plurality of sets of LUT values that calibrate the display device 10 for different viewing conditions and input video signal characteristics. Each set of LUT values can correspond to a different gamma value, different color chromaticity values, and/or a different color temperature. Each set can be stored in the storage mechanism 16. Thus, depending on the preferences of the viewer or on the viewing environment and input video signal characteristics, an appropriate set of LUT values can be selected and loaded into the embedded gamma correction LUTs 12 to achieve optimal perceived image quality.

Referring again to FIG. 3, the embedded gamma correction LUTs 12 reside in the display device 10, e.g., LCD, CRT, or PDP. The display device 10 is utilized by a display system (not shown), such as a television, which receives and processes an input video signal, and passes the input video signal to the display device 10 where the embedded gamma correction LUTs 12 are used to adjust the input video signal before it is displayed on the display screen 14.

Figure 12:
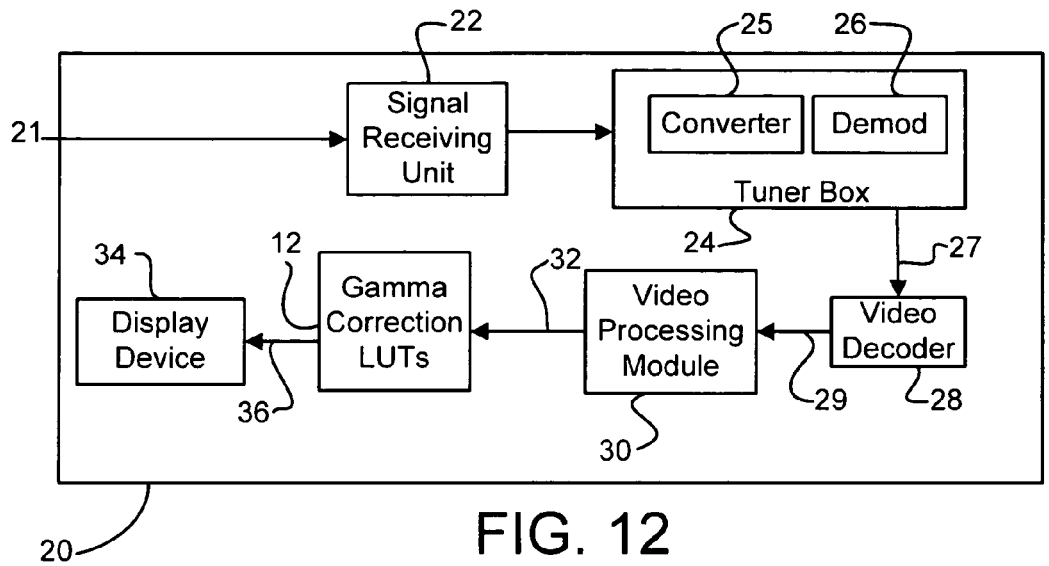
FIG. 12 depicts an exemplary display system according to a version of the present invention.

In one version, the embedded gamma correction LUTs 12 can reside in the display system. FIG. 12 depicts an exemplary display system according to a version of the present invention. The display system 20 includes a signal receiving unit 22 that is coupled to a tuner box 24, and a video decoder 28. Incoming signals 21, such as television signals, are captured by the signal receiving unit 22 and transmitted to the tuner box 24. The tuner box 24 includes a converter 25 and a demodulation unit 26 that transforms the incoming signal 21 into an analog signal 27. The analog signal 27 is received by the video decoder 28, which outputs an interlaced video signal 29. A video processor module 30 converts the interlaced video signal 29 into a progressive video signal 32. The progressive video signal 32 is then inputted into the embedded gamma correction LUTs 12 for adjustment and correction. The adjusted progressive video signal 36 is then displayed via the display device 34, such as an LCD, CRT or PDP.

Figure 13:
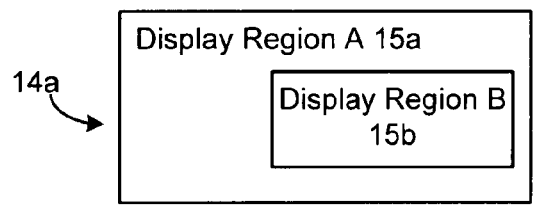
FIG. 13 depicts a display screen containing multiple display regions with different input video signal characteristics.

In another version, the display screen 14 can contain multiple display regions with different input video signal characteristics. FIG. 13 depicts a display screen 14a containing two display regions (15a, 15b) with different input video signal characteristics. For example, display region A (15a) may display an input video signal from a television signal source while display region B (15b) may display an input video signal from a computer graphic card.

Figure 14:
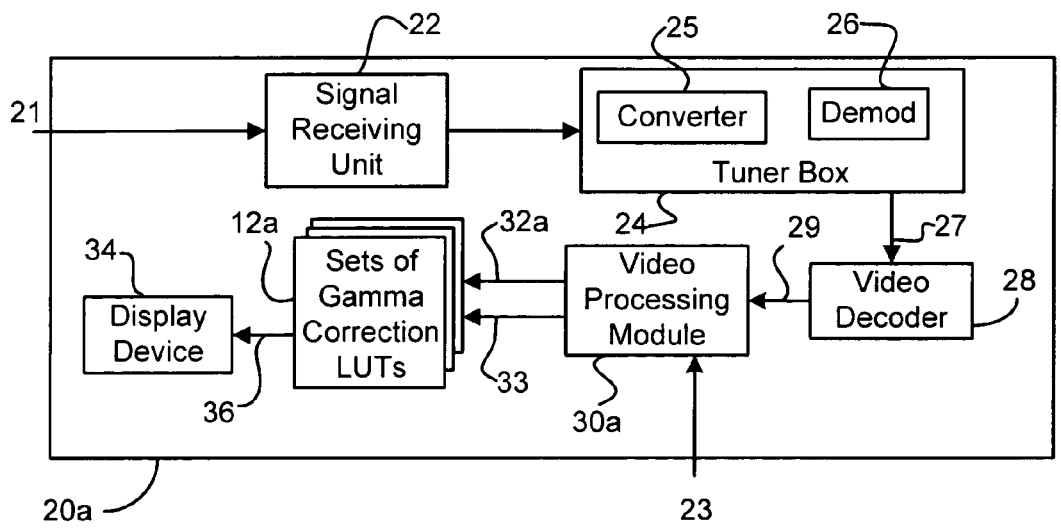
FIG. 14 depicts an exemplary display system according to another version of the present invention.

FIG. 14 depicts an exemplary display system according to another version of the present invention, where similar components are identified by similar item numerals. The display system 20a includes a video processor module 30a that converts a first interlaced video signal 29 into a progressive video signal. In addition to the first interlaced video signal 29, the video processor module 30a also receives a second input video signal 23 and converts it into a second progressive video signal. In a preferred embodiment, the video processor module 30a is configured to merge the two progressive video signals 29, 23 according to the positions of their assigned display regions, e.g., 15a and 15b, on the display screen 14a.

The video processor module 30a then generates a merged progressive video signal 32a. The merged progressive video signal 32a is inputted into a plurality of sets of embedded gamma correction LUTs 12a for adjustment and correction according to the input video signal characteristics.

According to this version of the present invention, a display region selection signal 33 is also generated by the video processor module 30a and inputted into the plurality of sets of embedded gamma correction LUTs 12a. The selection signal 33 determines which one of the sets of embedded gamma correction LUTs 12a can be used according to the positions of the multiple display regions, e.g., 15a and 15b. The adjusted progressive video signal 36 is then displayed via the display device 34, such as an LCD, CRT or PDP.

Versions of the present invention provide a method and system that automatically calibrate the luminance and color of a color display. The calibration system and process ensure accurate, stable gamma values, and a smooth luminance curve for typical display devices. In addition, versions of the present invention allow the luminance curve and gamma value to be changed to a setting different from a factory-preset setting, in order to achieve optimum perceived image quality under various viewing conditions and input video signal characteristics. Additional benefits include: (1) increasing the accuracy of color reproduction by reducing gray-level color temperature shift from as much as 5000K for a typical uncalibrated display device to less than 200K variation of color temperature for all gray levels above the threshold; (2) providing precise color balance among red, green, and blue primary color components throughout most of the gray levels; (3) maintaining gray-level color consistency and uniformity; (4) equalizing a color image displayed by a display device based on the color temperature of the ambient light for improved perceived picture quality; (5) adjusting the gamma value of the luminance curve of a display device according to the predetermined gamma value of an input gamma pre-corrected video signal; and (6) allowing the viewer to adjust the gamma value of the luminance curve of a display device based on the brightness level of the viewing environment for optimum image reproduction.

The calibration system and process according to the present invention can be used by television manufacturers to calibrate their products easily and quickly to satisfy different requirements relating to the accuracy and specification of luminance and color reproduction. Although different types of display devices, e.g., LCD, CRT, or PDP, can exhibit slightly different luminance and color characteristics, the calibration system according to the present invention can be used to ensure that an end product, e.g., television or monitor, exhibits consistent luminance and color characteristics. Indeed, the calibration system can be part of the factory assembly line. Furthermore, the calibration system according to the present invention provides television manufacturers with the flexibility to readily and conveniently procure key display devices and components from different vendors subject to availability and market conditions without jeopardizing the luminance and color consistency and uniformity of the end products.

The present invention has been described with reference to certain preferred versions. Nevertheless, other versions are possible. For example, the number and types of lookup tables can vary. Further, alternative steps equivalent to those described for the luminance and color calibration process can also be used in accordance with the parameters of the described implementations, as would be apparent to one of ordinary skill. Therefore, the spirit and scope of the appended claims should not be limited to the description of the preferred versions contained herein.

What is claimed is:

1. A system for calibrating a display device to improve its perceived image quality, the system comprising:
 a calibration module that is configured to:
  determine, for each of a plurality of white colors associated with a plurality of gray levels displayed sequentially by the display device, a measured chromaticity point on a chromaticity diagram and a measured luminance level;
  calculate, for each gray level, a differential change in each primary color component value that simultaneously moves the measured chromaticity point to a target chromaticity point and adjusts the measured luminance level to a target luminance level on a predetermined luminance curve having a target gamma value; and
  calculate correction values for each primary color component and each gray level based on the calculated differential changes; and
 means for outputting to the display device the calculated correction values,
 wherein the primary color components of a color video signal received by the display device are corrected based on the calculated correction values such that the display device accurately reproduces luminance and color properties of the color video signal.

2. The system of claim 1 further comprising:
 a test pattern controller coupled to an input of the display device, wherein the test pattern controller generates the plurality of white colors associated with the plurality of gray levels displayed sequentially by the display device; and
 a measuring probe for measuring luminance and color property data for each displayed white color.

3. The system of claim 1 wherein the calibration module includes a plurality of tables, wherein each table is associated with one primary color component, and each table stores the correction values for the associated primary color component and correlates each correction value to the corresponding gray level index.

4. The system of claim 1 wherein the calculated correction values are loaded into a plurality of lookup tables, wherein each lookup table is associated with a primary color component and loads the calculated correction values for the associated primary color component, and includes an output that is coupled to an input of a display screen of the display device.

5. The system of claim 4 wherein each of the plurality of lookup tables receives the associated primary color component of the input color video signal and outputs the corresponding correction value.

6. The system of claim 5 wherein the plurality of lookup tables is embedded in the display device.

7. The system of claim 5 wherein the plurality of lookup tables is embedded in a display system utilizing the display device.

8. The system of claim 1 wherein the target chromaticity point is a white point having a particular color temperature appropriate for a particular viewing condition and input video signal characteristics and the target gamma value is associated with the particular viewing condition and input video signal characteristics.

9. The system of claim 8 wherein the calibration module calculates a first set of correction values for each primary color component for a first target chromaticity point/gamma value pair, and calculates a second set of correction values for a second target chromaticity point/gamma value pair, wherein the first and second target chromaticity point/gamma value pairs are associated with first and second viewing conditions and input video signal characteristics, respectively.

10. The system of claim 9 wherein the first and second set of correction values are outputted to the display device and stored so that the display device uses either the first or second correction values to accurately reproduce luminance and color properties of the color video signal in either the first or second viewing condition and input video signal characteristics.

11. The system of claim 10 wherein the color video signal received by the display device is a merged color video signal comprising at least two input video signals having different video signal characteristics to be displayed in different regions of the display device, and for each different region, a different set of correction values are used to accurately reproduce luminance and color properties of the color video signal displayed in the corresponding region of the display device.

12. A display device comprising:
a display screen that displays primary color components of a color video signal;
a plurality of lookup tables, wherein each lookup table is associated with a primary color component and loads correction values for the associated primary color component, and includes an output that is coupled to an input of the display screen; and
a calibration system configured to determine the correction values during a calibration process, the calibration system comprising:
a calibration module configured to:
determine, for each of a plurality of white colors associated with a plurality of gray levels displayed sequentially by the display device, a measured chromaticity point on a chromaticity diagram and a measured luminance level;
calculate, for each gray level, a differential change in each primary color component value that simultaneously moves the measured chromaticity point to a target chromaticity point and adjusts the measured luminance level to a target luminance level on a predetermined luminance curve having a target gamma value; and
calculate correction values for each primary color component and each gray level based on the calculated differential changes; and
means for outputting to the display device the calculated correction values,
wherein each of the plurality of lookup tables receives the associated primary color component of an input color video signal and outputs the correction value to the display screen so that the display device accurately reproduces luminance and color properties of the color video signal.

13. The display device of claim 12 wherein the display device is a liquid-crystal display (LCD).

14. The display device of claim 12 wherein the calibration process is performed during a product assembly process.

15. The display device of claim 12 further comprising a storage mechanism that stores two or more sets of correction values, wherein each set is associated with a particular viewing condition and input video signal characteristics.

16. The display device of claim 15 wherein the display device accurately reproduces luminance and color properties of the color video signal for more than one particular viewing condition and input video signal characteristics by loading any one of the sets of correction values associated with a particular viewing condition and input video signal characteristics.

17. The display device of claim 15 wherein the display device is configured to display a color video signal comprising at least two different video signal characteristics in at least two different regions on a display screen by loading different sets of correction values associated with the at least two different video signal characteristics.

18. A display system comprising the display device of claim 12, the display system further comprising:
a signal receiving unit for receiving an input color video signal;
a tuner box for transforming the input signal into an analog signal;
a video decoder for transforming the analog signal into a plurality of interlaced video fields, wherein each video field comprises a plurality of pixels and each pixel is defined by a luminance value and chrominance values based on color differences; and
a video processing module for converting the interlaced video fields into a progressive color video signal, wherein each primary color component of the progressive color video signal is inputted into the associated lookup table.

19. A display system comprising:
a display device that displays primary color components of an input color video signal;
a plurality of lookup tables, wherein each lookup table is associated with a primary color component and loads correction values for the associated primary color component, and includes an output that is coupled to an input of the display device; and
a calibration system configured to determine the correction values during a calibration process, the calibration system comprising:
a calibration module configured to:
determine, for each of a plurality of white colors associated with a plurality of gray levels displayed sequentially by the display device, a measured chromaticity point on a chromaticity diagram and a measured luminance level;
calculate, for each gray level, a differential change in each primary color component value that simultaneously moves the measured chromaticity point to a target chromaticity point and adjusts the measured luminance level to a target luminance level on a predetermined luminance curve having a target gamma value; and
calculate correction values for each primary color component and each gray level based on the calculated differential changes; and
means for outputting to the display device the calculated correction values,
wherein each of the plurality of lookup tables receives the associated primary color component of an input color video signal and outputs the correction value to the display device so that the display device accurately reproduces luminance and color properties of the color video signal.

20. A method for improving perceived image quality of a display device used for displaying a color video signal, the method comprising:
determining, for each of a plurality of white colors associated with a plurality of gray levels displayed sequentially by the display device, a measured chromaticity point on a chromaticity diagram and a measured luminance level;

calculating, for each gray level, a differential change in each primary color component value that simultaneously moves the measured chromaticity point to a target chromaticity point and adjusts the measured luminance level to a target luminance level on a predetermined luminance curve having a target gamma value; and adjusting the primary color components of the color video signal based on the calculated differential changes such that the display device accurately reproduces luminance and color properties of the color video signal.

21. The method of claim 20 further including selecting a group of gray levels from the plurality of gray levels and measuring the displayed white colors associated with the selected group of gray levels.

22. The method of claim 20 wherein calculating the differential change includes:

calculating, for each gray level, a differential change in the measured chromaticity point and a differential change in the measured luminance level due to a unit differential change in each of the primary color components;

generating, for each gray level, a gradient vector associated with each primary color component based on the differential changes in the measured chromaticity point and in the measured luminance level, wherein the gradient vector for a primary color component represents how the measured chromaticity point will move due to a unit differential change in the primary color component; and using the gradient vectors to calculate, for each gray level, a correction adjustment to each primary color component that moves the measured chromaticity point to the target chromaticity point.

23. The method of claim 22 further comprising:

adjusting, for each gray level, the correction adjustment to each primary color component by a fractional adjustment factor so that the measured luminance level substantially matches the target luminance level.

24. The method of claim 20 further comprising:

providing a plurality of lookup tables, wherein each lookup table is associated with a primary color component;

loading into each lookup table correction values based on the calculated differential changes to the associated primary color component for each gray level; and coupling an output of each lookup table to a display screen in the display device.

25. The method of claim 24 wherein adjusting the primary color components of the color video signal includes:

receiving in each lookup table the associated primary color component of the color video signal;

determining a correction value corresponding to the gray level of the primary color component; and outputting the correction value to the display screen.

* * * * *